United States Patent [19]
Ohmae et al.

[11] Patent Number: 5,623,018
[45] Date of Patent: *Apr. 22, 1997

[54] THERMOPLASTIC RESIN COMPOSITION INCLUDING AN AMORPHOUS RESIN, AN EPOXY GROUP-CONTAINING ETHYLENE COPOLYMER, AND A POLYFUNCTIONAL COMPOUND OR A CARBOXYLIC ACID METAL SALT

[75] Inventors: Tadayuki Ohmae, Toyonaka; Noboru Yamaguchi; Kenzo Chikanari, both of Ichihara; Kiyoshi Ogura, Takatsuki, all of Japan

[73] Assignees: Sumitomo Chemical Company, Ltd.; Sumika A&L Inc., both of Osaka-fu, Japan

[ * ] Notice: The term of this patent shall not extend beyond the expiration date of Pat. No. 5,508,347.

[21] Appl. No.: 487,512

[22] Filed: Jun. 7, 1995

Related U.S. Application Data

[62] Division of Ser. No. 260,742, Jun. 15, 1994, Pat. No. 5,508,347.

[30] Foreign Application Priority Data

Jun. 16, 1993 [JP] Japan ................... 5-144950
Jun. 16, 1993 [JP] Japan ................... 5-144951

[51] Int. Cl.⁶ .......................... C08L 69/00; C08L 25/12; C08L 25/06; C08K 5/098
[52] U.S. Cl. .................. 525/74; 525/148; 525/208; 524/101; 523/436; 523/437; 523/455; 523/456; 523/459; 523/461
[58] Field of Search ................ 525/74, 148, 208; 523/436, 437, 455, 456, 459, 461; 524/101

[56] References Cited

U.S. PATENT DOCUMENTS

| | | |
|---|---|---|
| 3,477,978 | 11/1969 | Holub et al. . |
| 4,172,859 | 10/1979 | Epstein . |
| 4,454,284 | 6/1984 | Ueno et al. . |
| 4,461,871 | 7/1984 | Kometani et al. . |
| 4,898,911 | 2/1990 | Miyashita ................... 525/74 |
| 5,395,889 | 3/1995 | Fujiguchi ................... 525/148 |

FOREIGN PATENT DOCUMENTS

| | | |
|---|---|---|
| 0303782 | 2/1989 | European Pat. Off. . |
| 0312001 | 4/1989 | European Pat. Off. . |
| 0400890 | 12/1990 | European Pat. Off. . |
| 55-137155 | 10/1980 | Japan . |
| 56-99248 | 8/1981 | Japan . |
| 56-159247 | 12/1981 | Japan . |
| 125253 | 8/1982 | Japan ................... 525/148 |
| 61-53355 | 3/1986 | Japan . |
| 61-44897 | 10/1986 | Japan . |
| 63-137944 | 6/1988 | Japan . |
| 64-56762 | 3/1989 | Japan . |
| 1113452 | 5/1989 | Japan . |
| 3221551 | 9/1991 | Japan . |

*Primary Examiner*—David Buttner
*Attorney, Agent, or Firm*—Sughrue, Mion, Zinn, Macpeak & Seas

[57] ABSTRACT

Disclosed is a thermoplastic resin composition comprising (A) an amorphous resin and further comprising, per 100 parts by weight of the amorphous resin, 0.01 to 20 parts by weight of (B) an epoxy group-containing ethylene copolymer, and 0.01 to 20 parts by weight of at least one member selected from the group consisting of (C) a polyfunctional compound and (D) a carboxylic acid metal salt, wherein the polyfunctional compound contains, per molecule, at least two identical or different functional groups selected from the group consisting of carboxyl group, amino group, carboxylic acid anhydride group and a unit represented by the formula (1)

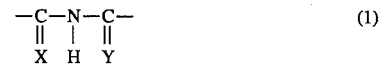

wherein X and Y are identical and each represents oxygen atom or sulfur atom, or one of X and Y is an oxygen atom and the other is a sulfur atom, or wherein the polyfunctional compound contains, per molecule, at least one unit represented by the formula (2)

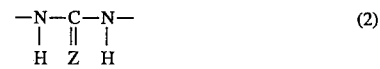

wherein Z represents oxygen atom or sulfur atom.

1 Claim, No Drawings

THERMOPLASTIC RESIN COMPOSITION INCLUDING AN AMORPHOUS RESIN, AN EPOXY GROUP-CONTAINING ETHYLENE COPOLYMER, AND A POLYFUNCTIONAL COMPOUND OR A CARBOXYLIC ACID METAL SALT

This is a divisional of application No. 08/260,742 now U.S. Pat. No. 5,508,347, filed Jun. 15, 1994.

BACKGROUND OF THE INVENTION

The present invention relates to a thermoplastic resin composition capable of providing a molded product which is well-balanced in properties such as impact resistance and heat resistance and which has a uniformly and closely delustered surface.

Amorphous resins such as polystyrene resins (aromatic vinyl polymers), AS resins (vinyl cyanide-aromatic vinyl copolymers), polycarbonate resins, ABS resins (vinyl cyanide-conjugated diene type rubber-aromatic vinyl copolymers), AES resins (vinyl cyanide-ethylene/propylene type rubber-aromatic vinyl copolymers), polyphenylene ether resins and the like are used in various fields including motor vehicles, light electrical appliances, miscellaneous goods and so on becuase of their excellent moldability, impact resistance, rigidity and excellent surface gloss.

However, all of these properties are not always necessary depending on the intended uses. For example, in the fields of automobile interior parts, office or household electrical appliances and the like, there is a demand for materials such as polystyrene resins, polycarbonate resins or ABS resins which are improved in properties to reduce the surface gloss of the molded article for providing a uniformly and closely matted surface without impairing other mechanical and chemical properties. The purposes of using these materials are various and are, for instance, to prevent automobile interior parts from reflecting light in the night for safety or to provide electrical appliances with high grade appearance in view of the current trend toward high grade products.

It has been heretofore known to deluster the surface of molded products by adding a filler such as an oxide or carbonate of titanium, magnesium, calcium or the like to amorphous resins, e.g. polystyrene resins, polycarbonate resins, etc., or to crystalline resins, e.g. polypropylene, saturated polyester resins, etc. However, this method can not satisfactorily deluster the surface of molded products.

Also well known delustering methods comprise adding or grafting a rubber-like elastomer to the foregoing resins or using a composition containing a crosslinkable ethylene copolymer (Japanese Unexamined Patent Publication No.89346/1984). Yet, these methods remain unsatisfactory in delustering effect, and have the drawback of giving moldings having irregularly delustered surface due to uneven dispersion of said filler, elastomer or crosslinkable ethylene copolymer.

SUMMARY OF THE INVENTION

To overcome the foregoing problems of the techniques heretofore known, the present inventors conducted extensive research on resin compositions which are effective in improving the properties of amorphous resins such as polystyrene-based resins, AS resins, polycarbonate resins, ABS resins, polyphenylene ether resins and the like, and found that a thermoplastic resin composition containing a specific compound can give a molded product having a delustered surface as well as well-balanced properties. Based on this finding, the inventors completed this invention.

The present invention provides a thermoplastic resin composition having an improved delustering property, the composition comprising (A) an amorphous resin, and further comprising, per 100 parts by weight of the amorphous resin, 0.01 to 20 parts by weight of (B) an epoxy group-containing ethylene copolymer, and 0.01 to 20 parts by weight of at least one member selected from the group consisting of (C) a polyfunctional compound and (D) a carboxylic acid metal salt, wherein said polyfunctional compound contains, per molecule, at least two identical or different functional groups selected from the group consisting of carboxyl group, amino group, carboxylic acid anhydride group and a unit represented by the formula (1)

 (1)

wherein X and Y are identical and each represents oxygen atom or sulfur atom, or one of X and Y is an oxygen atom and the other is a sulfur atom, or wherein said polyfunctional compound contains, per molecule, at least one unit represented by the formula (2)

 (2)

wherein Z represents oxygen atom or sulfur atom.

In accordance with one embodiment of the invention, said amorphous resin (A) is a polymer prepared from a rubber-like polymer, an aromatic vinyl compound and at least one member selected from the group consisting of vinyl cyanide compounds and other copolymerizable compounds.

In accordance with another embodiment of the invention, said amorphous resin (A) is an amorphos resin other than the above-mentioned polymer prepared from a rubber-like polymer, an aromatic vinyl compound and at least one member selected from the group consisting of vinyl cyanide compounds and other copolymerizable compounds.

DETAILED DESCRIPTION OF THE INVENTION

The present invention will be described in detail.

Amorphous Resin (A)

The amorphous resins to be used as amorphous resin (A) in the present invention are those which do not show an exothermic peak due to crystallization when heated to a melting temperature and then cooled at a rate of 10° C./minute using a differential scanning calorimeter (DSC).

Examples of amorphous resin (A) for use in the present invention are polystyrene-based resins, AS resins (vinyl cyanide-aromatic vinyl copolymers), polycarbonate resins, a polymer composed of a rubber-like polymer, an aromatic vinyl compound and at least one member selected from the group consisting of vinyl cyanide compounds and other copolymerizable compounds, such as ABS resins (vinyl cyanide-conjugated diene type rubber-aromatic vinyl copolymers) and AES resins (vinyl cyanide-ethylene/propylene type rubber-aromatic vinyl copolymers), polyphenylene ether resins, mixtures of these resins such as a mixture of a polyphenylene ether resin and a polystyrene-based resin, a mixture of a polyphenylene ether resin and a rubber-modified polystyrene-based resin, etc. Among them, preferred are polystyrene-based resins, AS resins, polycarbonate resins and ABS resins, as well as a mixture of these such as a mixture of a polystyrene-based resin and a polycarbonate resin or a mixture of a polycarbonate resin and an ABS resin and other mixtures.

The polystyrene-based resins to be used in the present invention are polymers composed of an aromatic vinyl compound. Examples of such aromatic vinyl compounds are, for example, styrene; alkyl-substituted styrenes (particularly styrene which has 1 to 2 $C_1$–$C_4$ alkyl groups on the benzene ring) such as o-methylstyrene, p-methylstyrene, m-methylstyrene, 2,4-dimethylstyrene, ethylstyrene, p-tert-butylstyrene and the like; α-alkyl-substituted styrenes (particularly α-($C_1$–$C_4$ alkyl)-styrene which may have 1 to 2 $C_1$–$C_4$ alkyl groups on the benzene ring) such as α-methylstyrene, α-methyl-p-methylstyrene and the like; halogen-substituted styrenes such as chlorostyrene and the like; and the polystyrene-based resins may be copolymers of at least two of these monomers. When required, these monomers can be copolymerized with one or more of other copolymerizable compounds such as esters of ethylenically unsaturated carboxylic acids (e.g., $C_1$–$C_4$ alkyl (meth)acrylates), amido group-containing vinyl compounds (e.g., (meth)acrylamide) or the like.

Specific examples of polystyrene-based resins are, for example, polystyrene (PS), styrene-α-methylstyrene copolymers, etc.

When required, amorphous resins such as the above-mentioned polystyrene-based resins may be used as having been copolymerized or grafted with a rubber-like polymer. Diene type rubber-like polymers or diene-free rubber-like polymers can be used as the rubber-like polymer. Useful diene type rubber-like polymers include, for example, polybutadiene, polyisoprene, natural rubber, etc. Examples of useful diene-free rubber-like polymers are ethylene-propylene copolymers, ethylene-propylene-nonconjugated diene copolymers, acrylic rubber, etc. These rubber-like polymers can be used singly or at least two of them are usable in mixture. It is also possible to use a mixture of a conjugated diene type rubber-like polymer and a nonconjugated diene type rubber-like polymer.

Specific examples are rubber-modifed polystyrene-based resins such as polybutadiene rubber-modified polystyrene resins (known as HIPS, i.e., high impact polystyrene).

AS resins to be used in the present invention are copolymers prepared by copolymerizing a vinyl cyanide compound and an aromatic vinyl compound. Examples of the vinyl cyanide compound are acrylonitrile, methacrylonitrile, etc. Examples of the aromatic vinyl compound include those exemplified above with respect to the polystyrene-based resin. If desired, at least two vinyl cyanide compounds may be copolymerized with at least two aromatic vinyl compounds.

Specific examples of AS resins are acrylonitrile-styrene copolymers, methacrylonitrile-styrene copolymers, acrylonitrile-styrene-α-methylstyrene terpolymers, etc.

The polycarbonate resin (PC) to be used in the invention is one composed predominantly of a product prepared by condensing a carbonic acid derivative and a dihydric phenol represented by the formula (3)

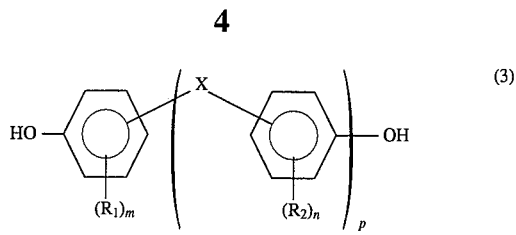

wherein X is a group selected from the group consisting of an alkylene group having 1 to 10 carbon atoms, an alkylidene group having 1 to 10 carbon atoms, a cycloalkylene group having 4 to 8 carbon atoms, —O—, —S— and —$SO_2$—, $R_1$ and $R_2$ are the same or different and each represents a halogen atom or an alkyl group having 1 to 12 carbon atoms, m and n are an integer of 0 to 4, and p is an integer of 0 or 1.

Specific examples of the compound of the formula (3) are bisphenol A, bis-(4-hydroxyphenyl)-methane, bis-(4-hydroxy-3-methylphenyl)propane, 2,2-bis-(3', 5'-dibromo-4'-hydroxphenyl)propane, resorcin, hydroquinone, etc. Among them, bisphenol A is preferred.

Useful carbonic acid derivatives are, for example, phosgene, diphenylcarbonate, haloformate of bisphenol A, etc.

The polymers composed of a rubber-like polymer, an aromatic vinyl compound and at least one member selected from the group consisting of vinyl cyanide compounds and other copolymerizable compounds to be used in the present invention are typically ABS resins and AES resins, but generally include the following polymers (i), (ii) and (iii):

(i) a polymer composed of (a) a rubber-like polymer, (b) an aromatic vinyl compound and (c) a vinyl cyanide compound, (ii) a polymer composed of (a) a rubber-like polymer, (b) an aromatic vinyl compound and (d) other copolymerizable compound, and (iii) a polymer composed of (a) a rubber-like polymer, (b) an aromatic vinyl compound, (c) a vinyl cyanide compound and (d) other copolymerizable compound.

The polymers (i) to (iii) are polymers prepared by graft-polymerizing a rubber-like polymer, an aromatic vinyl compound and at least one member selected from the group consisting of vinyl cyanide compounds and other copolymerizable compounds, and the method of copolymerizing these monomers includes conventional processes such as emulsion polymerization, suspension polymerization, bulk polymerization, solution polymerization, a combination of such polymerization methods, etc.

While the polymers prepared by any of the above polymerization methods can be effectively used in the present invention, the polymers prepared by bulk polymerization or emulsion polymerization method are preferred.

Examples of the above rubber-like polymer (a) are conjugated diene type rubbers such as polybutadiene, polyisoprene, butadiene-styrene copolymers, isoprene-styrene copolymers, butadiene-acrylonitrile copolymers, butadiene-isoprene-styrene copolymers, polychloroprene or the like; ethylene-propylene type rubbers such as ethylene-propylene copolymers, ethylene-propylene-nonconjugated diene (e.g., ethylidene-norbornene, dicyclopentadiene, etc.) copolymers or the like; and acrylic rubbers such as polybutyl acrylate, etc. These rubber-like polymers can be used singly or at least two of them are usable in admixture. Preferable are conjugated diene-type rubbers, ethylene-propylene type rubbers, etc.

Generally, in said polymers (i)–(iii), a graft polymer is formed because at least a portion of said aromatic vinyl compound (b) and vinyl cyanide compound (c) and/or other copolymerizable compound (d) is graft-polymerized to said rubber-like polymer (a), and this graft polymer is present as dispersed in the continuous phase composed of a copolymer of said aromatic vinyl compound and said at least one member selected from the group consisting of vinyl cyanide compounds and other copolymerizable compounds. While there is no particular restriction on the particle size of the graft polymer, the average particle size thereof is preferably in the range of 0.1 to 5 μm, particularly in the range of 0.2 to 3 μm, from the standpoint of the impact resistance, heat resistance, delustering property (gloss), rigidity, processability, etc.

Examples of the aromatic vinyl compound (b) are styrene, α-methylstyrene, α-ethylstyrene, dimethylstyrene, chlorostyrene, para-methylstyrene, etc. These compounds can be used singly or at least two of them are usable in mixture.

Examples of the vinyl cyanide compound (c) are acrylonitrile, methacrylonitrile and the like. Said other copolymerizable compound (d) includes, for example, (meth)acrylic acid ester compounds, especially $C_1$–$C_4$ alkyl esters of (meth)acrylic acid, such as methyl methacrylate, methyl acrylate and the like; maleimide compounds such as N-phenylmaleimide, N-cyclohexyl-maleimide and the like. These compounds can be used singly or at least two of them are usable in mixture.

From the viewpoint of mechanical properties, thermal properties and processability, preferred polymers are those composed of 5 to 30% by weight (preferably 10 to 25% by weight) of rubber-like polymer (a), 70 to 40% by weight (preferably 65 to 50% by weight) of aromatic vinyl compound (b) and 10 to 40% by weight (preferably 20 to 35% by weight) of at least one member selected from the group consisting of vinyl cyanide compound (c) and other copolymerizable compound (d).

Examples of polymers having such monomer composition are acrylonitrile-butadiene type rubber-styrene copolymers (ABS), acrylonitrile-ethylene/propylene type rubber-styrene copolymers (AES), methyl methacrylate-butadiene type rubber-styrene copolymers (MBS), acrylonitrile-butadiene type rubber-styrene-methyl methacrylate copolymers (ABSM), acrylonitrile-acrylic acid ester type rubber-styrene copolymers (AAS), etc.

When required, it is possible to use a mixture of said graft polymer and other copolymer which is free of rubber component, the monomer composition of the mixture being within the above-specified range. For example, it is possible to use, as amorphous resin (A), a mixture of (i) about 30 to 70% by weight of a graft polymer composed of said rubber-like polymer (a), said aromatic vinyl compound (b) and at least one member selected from the group consisting of said vinyl cyanide compounds (c) and said other copolymerizable compounds (d), and (ii) about 70 to 30% by weight of a copolymer composed of said aromatic vinyl compound (b) and at least one member selected from the group consisting of said vinyl cyanide compounds (c) and said other copolymerizable compounds (d), wherein the rubber-like polymer (a), monomer (b) and at least one of monomers (c) and (d) are present in the above-specified proportions.

Examples of the latter copolymer (ii) are styrene-acrylonitrile copolymers (AS), methyl methacrylate-styrene copolymers (MS), methyl methacrylate-acrylonitrile-styrene copolymers (MAS), etc. Further examples of such polymer mixtures are mixtures of an ABS resin with at least one member selected from the group consisting of α-methylstyrene-acrylonitrile copolymer (αMS-ACN), styrene-N-phenylmaleimide copolymers (S-NPMI) and styrene-N-phenylmaleimide-acrylonitrile copolymers (S-A-NPMI).

Of these, preferable are acrylonitrile-diene type rubber-styrene copolymers such as ABS and AES resins, as well as a mixture of (i) at least one member of ABS and AES resins and (ii) at least one member of AS, αMS-ACN and S-A-NPMI. Among them, those produced by emulsion polymerization method or bulk polymerization method are preferred.

Epoxy Group-Containing Ethylene Copolymer (B)

The epoxy group-containing ethylene copolymer (B) for use in the invention can be any of ethylene copolymers which contain epoxy group(s). Preferred epoxy group-containing ethylene copolymers include, for example, an ethylene copolymer of (a) 50 to 99% by weight of ethylene unit, (b) 0.1 to 30% by weight, preferably 0.5 to 20% by weight, of an unsaturated carboxylic acid glycidyl ester unit or unsaturated glycidyl ether unit and (c) 0 to 50% by weight of other ethylenically unsaturated compound unit.

In epoxy group-containing ethylene copolymer (B), the unsaturated carboxylic acid glycidyl ester unit is represented by the formula (4)

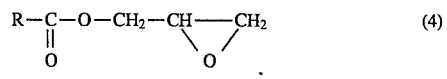

wherein R is a hydrocarbon group having 2 to 18 carbon atoms which has at least one ethylenically unsaturated bond, and the unsaturated glycidyl ether unit is represented by the formula (5)

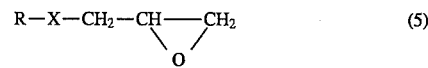

wherein R is a hydrocarbon group of 2 to 18 carbon atoms which has at least one ethylenically unsaturated bond and X is —$CH_2$—O— or a group represented by the formula (6)

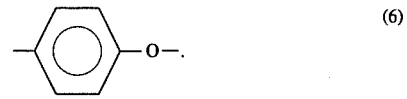

Examples of the unsaturated carboxylic acid glycidyl ester unit or unsaturated glycidyl ether unit are glycidyl acrylate, glycidyl methacrylate, glycidyl ester of itaconic acid, ally glycidyl ether, 2-methylallylglycidyl ether, styrene-p-glycidyl ether, etc.

Examples of said other ethylenically unsaturated compound (c) are α,β-unsaturated carboxylic acid alkyl esters, especially $C_1$–$C_4$ alkyl esters of (meth)acrylic acid, such as methyl acrylate, ethyl acrylate, butyl acrylate, methyl methacrylate, ethyl methacrylate, butyl methacrylate, etc., carboxylic acid vinyl esters such as vinyl acetate, vinyl propionate, vinyl butanoate, vinyl benzoate, etc., vinyl ethers such as methyl vinyl ether, ethyl vinyl ether, phenyl vinyl ether, etc. and styrenes such as styrene, methylstyrene, ethylstyrene, dimethylstyrene, etc.

Examples of the epoxy group-containing ethylene copolymer (B) are those composed of three or more comonomers, namely those which contain at least (a) ethylene, (b) said unsaturated carboxylic acid glycidyl ester or unsaturated glycidyl ether and (c) said other ethylenically unsaturated compound, each of the components (a), (b) and (c) being present in the above-specified proportions. Another example of the epoxy group-containing ethylene copolymer (B) is a copolymer free of said other ethylenically unsaturated compound (c), such as a copolymer of (a) 70 to 99% by weight of ethylene and ( b ) 1 to 30% by weight of said unsaturated carboxylic acid glycidyl ester or unsaturated glycidyl ether.

Specific examples of the epoxy group-containing ethylene copolymer (B) as stated immediately above are ethylene-glycidyl methacrylate copolymers, ethylene-glycidyl methacrylate-methyl acrylate terpolymers, ethylene-glycidyl methacrylate-ethyl acrylate terpolymers, ethylene-glycidyl methacrylate-vinyl acetate terpolymers, etc., each having the above-specified monomer composition. Among them, preferred are said ethylene-glycidyl methacrylate copolymers, ethylene-glycidyl methacrylate-methyl acrylate terpolymers, ethylene-glycidyl methacrylate-vinyl acetate terpolymers, etc.

The melt index of the epoxy group-containing ethylene copolymer (B) (as determined according to ASTM D1238) is not specifically limited, but is preferably in the range of 0.5 to 100 g/10 min.

Methods for preparing the epoxy group-containing ethylene copolymer (B) are not specifically limited, but can be any of, for example, a random copolymerization method in which the unsaturated epoxy compound is introduced into the main chain of the copolymer and a graft copolymerization method in which the unsaturated epoxy compound is introduced into the side chain of the copolymer. More specifically, there can be mentioned a method comprising copolymerizing an unsaturated epoxy compound, ethylene and if desired other ethylenically unsaturated compound using a radical polymerization initiator in the presence or absence of a suitable solvent and a chain transfer agent under a pressure of 500 to 4000 atm. at a temperature of 100° to 300° C., and a method comprising mixing together a polyethylene or an ethylene-based copolymer, an unsaturated epoxy compound and a radical polymerization initiator and graft-copolymerizing the molten mixture in an extruder. The above radical polymerization method is described, for example, in Japanese Unexamined Patent Publication No. 47-23490.

The amount of the epoxy group-containing ethylene copolymer (B) to be used in the invention is 0.01 to 20 parts by weight, preferably 0.1 to 10 parts by weight, per 100 parts by weight of the amorphous resin (A). Use of less than 0.01 part by weight fails to impart a satisfactorily delustered surface to the resulting molded product, whereas use of more than 20 parts by weight impairs the processability and the mechanical properties, failing to give the desirable results.

Polyfunctional Compound (C)

Examples of polyfunctional compound (C) are compounds containing, per molecule, at least two (preferably 2 to 4) identical or different functional groups selected from the group consisting of carboxyl group amino group, carboxylic acid anhydride group and the unit represented by the foregoing formula (1).

Examples of the polyfunctional compound (C) having at least two (preferably 2 to 4) carboxyl groups per molecule are polycarboxylic acids. Examples of such polycarboxylic acids are aliphatic polycarboxylic acids, especially $C_2$–$C_{20}$ aliphatic dicarboxylic acids, such as oxalic acid, succinic acid, adipic acid, azelaic acid, sebacic acid, dodecanedicarboxylic acid, carbarylic acid, cyclohexanedicarboxylic acid, cyclopentanedicarboxylic acid, etc., aromatic polycarboxylic acids, especially $C_8$–$C_{20}$ aromatic di- or tri-carboxylic acids, such as terephthalic acid, isophthalic acid, orthophthalic acid, naphthalenedicarboxylic acid, biphenyldicarboxylic acid, trimesic acid, trimellitic acid, etc. Among these polycarboxylic acids, preferred are aliphatic polycarboxylic acids.

Examples of the polyfunctional compound (C) having at least two (preferably 2 to 4) amino groups per molecule are aliphatic diamines, especially $C_2$–$C_{20}$ aliphatic diamines, such as 1,6-hexamethylenediamine, trimethylhexamethylenediamine, 1,4-diaminobutane, 1,3-diaminopropane, ethylenediamine, etc.; aliphatic diamine carbamates, especially $C_3$–$C_{21}$ aliphatic diamine carbamates, such as hexamethylenediamine carbamate, ethylenediamine carbamate etc.; aliphatic polyamines, especially $C_4$–$C_{20}$ aliphatic polyamines, such as diethylenetriamine, triethylenetetramine, tetraethylenepentamine, pentaethylenehexamine, ethylaminoethylamine, methylaminopropylamine, 2-hydroxyethylaminopropylamine, aminoethylethanolamine, 1,3-bis(3-aminopropoxy)-2,2-dimethylpropane, 1,3,6-trisaminomethylhexane, iminobispropylamine, methyliminobispropylamine, bis(hexamethylene)triamine, etc.; alicyclic polyamines, especially $C_4$–$C_{20}$ alicyclic polyamines, such as menthenediamine, N-aminoethylpiperazine, 1,3-diaminocyclohexane, isophoronediamine, bis(4-amino-3-mehylcyclohexyl)methane, etc.; aliphatic polyamines having an aromatic ring, especially $C_6$–$C_{20}$ aliphatic polyamines having a benzene ring, such as m-xylenediamine, tetrachloro-p-xylylenediamine, etc.; aromatic amines, especially $C_6$–$C_{20}$ aromatic amines such as m-phenylenediamine, o-phenylenediamine, diaminodiphenylether, 4,4'-methylenedianiline, diaminodiphenylsulfone, benzidine, 4,4'-bis(o-toluidine), 4,4'-thiodianiline, dianisidine, methylenebis(o-chloroaniline), 2,4-toluenediamine, bis(3,4-diaminophenyl)sulfone, diaminoditolylsulfone, 4-chloro-o-phenylenediamine, 4-methoxy-6-methyl-m-phenylenediamine, m-aminobenzylamine, etc., silicon-containing polyamines such as 1,3-bis(γ-aminopropyl)-1,1,3,3-tetramethyldicyclohexane, etc.

Also usable as the polyfunctional compound (C) having at least two amino groups per molecule are, for example, dihydrazide compounds, especially dihydrazide of a $C_4$–$C_{22}$ dicarboxylic acid, such as succinic acid dihydrazide, adipic acid dihydrazide, isophthalic acid dihydrazide, eicosandioic acid dihydrazide, etc.; diaminomaleonitrile, melamine, etc., as well as compounds which are conventionally used as a curing agent for an epoxy resin, such as 2,4,6-tris(dimethylaminomethyl)phenol, 2-ethyl-4-methylimidazole, etc.

Examples of the polyfunctional compound (C) having at least 2 (preferably 2 to 4) carboxylic anhydride groups per molecule are trimellitic anhydride, pyromellitic anhydride, ethylene glycol bis(anhydrotrimellitate), etc.

Examples of the polyfunctional compound (C) having at least 2 (preferably 2 to 4) units of the formula (1) per molecule are pyromellitic acid diimide, mellitic acid triimide, 1,4,5,8-naphthalic acid diimide, and the corresponding thioimides, as well as alloxantin, etc.

Polyfunctional compound (C) also includes compounds which contain, per molecule, at least one member selected from the group consisting of carboxyl group, amino group or carboxylic acid anhydride group and which also contain at least one unit of the formula (1) per molecule. Typical examples of this type are triuret, 1-methyltriuret, 1,1-diethyltriuret, tetrauret, as well as the corresponding thiourets, etc.

Examples of the polyfunctional compound (C) also include those having, per molecule, at least two functional groups selected from the group consisting of carboxyl group, amino group and carboxylic anhydride group. This type of the polyfunctional compound preferably has 2 to 20 carbon atoms, and typical examples of such compounds are 4-aminobutyric acid, 6-aminohexanoic acid, 12-aminododecanoic acid, etc.

Examples of polyfunctional compound (C) which contains at least one unit of the foregoing formula (2) per molecule are parabanic acid, isocyanuric acid, alloxan, alloxan-5-oxime, barbituric acid, 5,5-diethylbarbituric acid, 5-ethyl-5-phenyl-barbituric acid, 5-(1-methyl-butyl)-5-allyl-barbituric acid, 5,5-diallylbarbituric acid, hydantoic acid, etc., as well as the corresponding compounds with the oxygen atom or atoms of their —C=O moiety or moieties replaced by sulfur atom(s), such as 2,4-dithiobarbituric acid, 2-thiobarbituric acid, etc.

The polyfunctional compounds (C) given above can be used singly or at least two of them may be used in mixture.

Carboxylic Acid Metal Salt (D)

The carboxylic acid metal salt (D) to be used in the present invention is a salt of a compound having at least one carboxyl group, preferably 1 or 2 carboxyl groups. Examples thereof are metal salts of aliphatic carboxylic acids, preferably $C_2$–$C_{20}$ aliphatic mono- or di-carboxylic acids, such as acetic acid, capric acid, lauric acid, tridecylic acid, myristic acid, stearic acid, nonadecanoic acid, adipic acid, azelaic acid, sebacic acid, dodecanedicarboxylic acid, tricarballylic acid, oleic acid, linoleic acid, tetrahydrophthalic acid, etc., metal salts of aromatic carboxylic acids, preferably $C_7$–$C_{13}$ aromatic mono-, di- or tri-carboxylic acids, such as benzoic acid, toluic acid, naphthoic acid, anthracenecarboxylic acid, biphenylcarboxylic acid, trimesic acid, trimellitic acid, cinnamic acid, etc.

Examples of the metals constituting the foregoing metal salts are alkali metals such as lithium, sodium, potassium, etc., alkaline earth metals such as magnesium, calcium, strontium, etc., zinc, aluminum and so on.

Preferred examples of the carboxylic acid metal salt (D) are alkali metal B or alkaline earth metals of aliphatic carboxylic acid preferably $C_4$–$C_{22}$ aliphatic monocarboxylic acids, such as sodium stearate, magnesium stearate, calcium stearate, sodium acetate, sodium oleate, etc.

The components (C) and (D) can be used singly or in mixture with each other. The mixing ratio of these components is not specifically limited. When component (D) is used, it is effective to use it in combination with a carboxylic acid such as stearic acid, oleic acid, benzoic acid or the like.

The amount of at least one member selected from the group consisting of polyfunctional compound (C) and carboxylic acid metal salt (D) to be used in the invention is 0.01 to 20 parts by weight, preferably 0.1 to 10 parts by weight, per 100 parts by weight of the amorphous resin (A). Use of less than 0.01 part by weight fails to give a molded product having satisfactorily delustered surface, whereas use of more than 20 parts by weight reduces the moldability, thereby giving an impaired appearance to the resulting molded products, such as flow marks formed on their surfaces.

In preparing the thermoplastic resin composition of the present invention, there is no particular restriction on the method how the components are mixed, and the foregoing components can be mixed together by a conventional method, for example, by kneading a molten mixture thereof, etc. Such kneading can be conducted using a conventional keading apparatus, such as a single-screw or, double-screw extruder, Banbury mixer, rolls, various kneaders and so on. The order of mixing is not critical. For example, the components may be kneaded all at one time, or one component may be added to a premix of the two other components.

Alternatively, a high concentration master batch is first prepared by kneading a molten mixture of a portion of amorphos resin (A), epoxy group-containing ethylene copolymer (B) and at least one member selected from the group consisting of polyfunctional compound (C) and carboxylic acid metal salt (D) and then adding a suitable amount of the master batch to the remaining portion of amorphous resin (A).

The thermoplastic resin composition of the present invention may contain additives insofar as the use of such additives does not impair the moldability and other properties of the composition. Examples of useful additives are pigments, dyes, reinforcing agents, fillers, heat stabilizing agents, antioxidants, weathering agents, nucleating agents, lubricants, antistatic agents, mold release agents, fire retardants, plasticizers, etc.

If desired, the thermoplastic resin composition of the present invention may incorporate other thermoplastic resins such as polyethylene terephthalate, polybutylene terephthalate, polyethylene, polypropylene, etc.

Molding methods for molding the thermoplastic resin composition of the invention are not critical, and may be conventional molding methods such as injection molding, extrusion molding and the like.

As described above, the thermoplastic resin composition of the invention can give a molded product having a uniformly and closely delustered surface by simply molding the composition in a conventional manner.

Furthermore, the thermoplastic resin composition of the invention can produce a molded product having properties such as mechanical properties (e.g. impact resistance and rigidity), thermal properties and processability or moldability, which properties are well balanced.

The thermoplastic resin composition of the invention can be easily molded into molded articles, films, sheets, etc. by methods conventionally used for molding usual thermoplastic resin compositions, e.g. by injection molding, extrusion molding and the like.

EXAMPLES

The following examples illustrate the present invention. However, they are by no means limitative of the scope of the present invention. In the examples, the properties were determined by the following methods.

(1) Degree of surface delustering (gloss)

Determined with use of a gloss meter GM-3D (product of Murakami Shikisai Gijutsu Kenkyusho) under the condition of 60°.

(2) Melt flow rate (MI)

Determined according to ASTM D1238.

(3) Izod impact strength

Determined according to ASTM D256 (6.4 mm in sample thickness, measured at 23° C. and −30° C., provided with V-notch).

(4) Flexural modulus

Determined according to ASTM D790 (3.2 mm in sample thickness).

(5) Thermal deformation temperature

Determined according to ASTM D648 (6.4 mm in sample thickness, 18.6 kgf/cm$^2$ in fiber stress)

In Examples and Comparative Examples, the following resins are used as amorphous resin (A) and epoxy-containing ethylene copolymer (B).

Amorphous Resin (A)

(i) PS: polystyrene (tradename "Sumibrite E183", product of Sumitomo Chemical Company, Limited MI=2.3 g/10 min., 200° C., 5 kg load)

(ii) HIPS: a polybutadiene rubber-modified polystyrene resin (tradename "Sumibrite M540", product of Sumitomo Chemical Company, Limited, MI=11 g/10 min , 200° C., 5 kg load)

(iii) AS: a copolymer of 28 wt. % of acrylonitrile and 72 wt. % of styrene (MI=39 g/10 min., 220° C., 10 kg load)

(iv) PC: a polycarbonate resin (tradename "Calibre 200-13", product of Sumitomo Dow Limited, MI=13 g/10 min., 300° C., 1.2 kg load)

(v) ABS (1): a high heat resistance ABS composed of a mixture of an acrylonitrile-diene type rubber-styrene copolymer and an α-methylstyrene-acrylonitrile copolymer, prepared by emulsion polymerization (tradename "Kralastic K2938F", product of Sumitomo Dow Limited)

(vi) ABS (2): a general purpose ABS composed of a mixture of an acrylonitrile-diene type rubber-styrene copolymer and a styrene-acrylonitrile copolymer, prepared by bulk polymerization (tradename "Magnum 213", product of The Dow Chemical Company)

Epoxy-Containing Ethylene Copolymer (B) (i)
Copolymer (1): E/MA/GMA=65/15/20 wt. %
(MI=10 g/10 min.)

(ii) Copolymer (2): E/VA/GMA/=83/5/12 wt. % (MI=3 g/10 min.)

(iii) Copolymer (3): E/GMA=88/12 wt. % (MI=3 g/10 min.)

(iv) Copolymer (4): E/MA/GMA=66/28/6 wt. % (MI=10 g/10 min.)

(v) Copolymer (5): E/VA/GMA=83/5/12 wt. % (MI=7 g/10 min.)

In the above, E represents ethylene; GMA, glycydil methacrylate; VA, vinyl acetate; MA, methyl acrylate; and MI, melt flow rate as determined under the conditions of 190° C. and 2.16 kg load according to ASTM D1238.

EXAMPLES 1–21

Using a single screw extruder (30 mm in diameter), epoxy-containing ethylene copolymer (B) and polyfunctional compound (C) or carboxylic acid metal salt (D) shown in Tables 1, 2 and 3 were added to amorphous resin (A) shown in Tables 1, 2 and 3 in the proportions indicated in the tables, and each of the mixtures was melted and kneaded at 250° C. to obtain thermoplastic resin compositions.

Each of the compositions was dried at 105°–110° C. for 3 hours, and then, using 5-ounce injection molding machine, the test pieces for determining properties were prepared under the following conditions: for the test pieces containing PS, HIPS, AS or ABS, at a molding temperature of 250° C. under an injection pressure which was equal to the minimum filling pressure plus 10 kgf/cm$^2$, and at a mold temperature of 50° C.; and for the test pieces containing PC, at a molding temperature of 280° C. under an injection pressure which was equal to the minimum filling pressure plus 10 kgf/cm$^2$ and at a mold temperature of 90° C.

The results of determining the properties of the test pieces were shown in Tables 1, 2 and 4.

COMPARATIVE EXAMPLES 1, 5, 9, 13, 17 AND 21

Epoxy-containing ethylene copolymer (B) shown in Tables 1, 2 and 3 was added to amorphous resin (A) shown in Tables 1, 2 and 3, and each of the mixtures was melted and kneaded in the same manner as in Example 1 to give thermoplastic resin compositions. Then, test pieces were prepared from the resin compositions in the same manner as in Example 1.

The results of determining the properties of the test pieces were shown in Tables 1, 2 and 4.

COMPARATIVE EXAMPLES 2, 3, 6, 7, 10, 11, 14, 15, 18, 19, 22 AND 23

Polyfunctional compound (C) or carboxylic acid metal salt (D) shown in Tables 1, 2 and 3 was added to amorphous resin (A) shown in Tables 1, 2 and 3, and each of the mixtures was melted and kneaded in the same manner as in Example 1 to give thermoplastic resin compositions. Then, test pieces were prepared from the resin compositions in the same manner as in Example 1.

The results of determining the properties of the test pieces were shown in Tables 1, 2 and 4.

COMPARATIVE EXAMPLES 4, 8, 12, 16, 20 AND 24

Using amorphous resin (A) shown in Tables 1, 2 and 3 singly, test pieces were prepared in the same manner as in Example 1.

The results of determining the properties of the test pieces were shown in Tables 1, 2 and 4.

The following facts are apparent from the results shown in Tables 1 and 2.

When only PS as component (A) is used, the resulting test piece exhibits a gloss of 99% (Comparative Example 4). A test piece composed of PS and one of components (B), (C) and (D) also exhibits a gloss of 99% and a lowered gloss can not be attained (Comparative Examples 1–3). On the other hand, when PS is used in combination with components (B) and (C) or in combination with components (B) and (D), the resulting test piece shows a gloss as low as about 60%, which means a composition with good delustering property can be obtained (Examples 1–7).

When only HIPS as component (A) is used, the resulting test piece exhibits a gloss of 50% (Comparative Example 8). A test piece composed of HIPS and one of components (B), (C) and (D) also exhibits a gloss of about 50% and a lowered gloss can not be attained (Comparative Examples 5–7). On the other hand, when HIPS is used in combination with components (B) and (C) or in combination with components (B) and (D), the resulting test piece shows a gloss as low as about 40%, which means a composition with good delustering property can be obtained (Examples 8 and 9).

The similar thing can be said when component (A) is AS (Examples 10 and 11 and Comparative Examples 9–12) and when component (A) is PC (Examples 12 and 13 and Comparative Examples 13–16).

The following facts are apparent from the results shown in Table 4.

When only ABS(1) as component (A) is used, the resulting test piece exhibits a gloss of 87% (Comparative Example 20). A test piece composed of ABS(1) and one of components (C) and (D) also exhibits a gloss of 85% and a lowered gloss can not be attained (Comparative Examples 18 and 19). A test piece composed of ABS(1) and component (B) exhibits a relatively low gloss of 38%, which, however, is not sufficiently low (Comparative Example 17). On the other hand, when ABS (1) is used in combination with component (B) and one of components (C) and (D), the resulting test piece shows a gloss as low as about 20%, and still has a relatively high MI value and impact strength, which means the properties possessed by it are well balanced (Examples 14–19).

Similar thing can be said when component (A) is ABS(2) (Examples 20 and 21 and Comparative Examples 21–24).

TABLE 1

| | Component | | | | Gloss |
|---|---|---|---|---|---|
| | (A) wt.part | (B) wt.part | (C) wt.part | (D) wt.part | 60° (%) |
| Ex. 1 | PS 100 | Copolymer(1) 3 | — | Magnesium stearate 1 | 59 |
| Ex. 2 | PS 100 | Copolymer(1) 3 | — | Calcium stearate 1 | 61 |
| Ex. 3 | PS 100 | Copolymer(1) 3 | Adipic acid 1 | — | 62 |
| Ex. 4 | PS 100 | Copolymer(1) 3 | Isocyanuric acid 1 | — | 60 |
| Ex. 5 | PS 100 | Copolymer(2) 3 | — | Magnesium stearate 1 | 65 |
| Ex. 6 | PS 100 | Copolymer(3) 3 | — | Zinc stearate 1 | 63 |
| Ex. 7 | PS 100 | Copolymer(3) 3 | Hexa-methylene-diamine carbamate 1 | — | 63 |
| Comp. Ex.1 | PS 100 | Copolymer(1) 3 | — | — | 99 |
| Comp. Ex.2 | PS 100 | — | — | Magnesium stearate 1 | 99 |
| Comp. Ex.3 | PS 100 | — | Adipic acid 1 | — | 99 |
| Comp. Ex.4 | PS 100 | — | — | — | 99 |
| Ex. 8 | HIPS 100 | Copolymer(1) 3 | — | Magnesium stearate 1 | 37 |
| Ex. 9 | HIPS 100 | Copolymer(1) 3 | Adipic acid 1 | — | 39 |
| Comp. Ex.5 | HIPS 100 | Copolymer(1) 3 | — | — | 51 |
| Comp. Ex.6 | HIPS 100 | — | — | Magnesium stearate 1 | 51 |
| Comp. Ex.7 | HIPS 100 | — | Adipic acid 1 | — | 49 |
| Comp. Ex.8 | HIPS 100 | — | — | — | 50 |

TABLE 2

| | Component | | | | Gloss |
|---|---|---|---|---|---|
| | (A) wt.part | (B) wt.part | (C) wt.part | (D) wt.part | 60° (%) |
| Ex. 10 | AS 100 | Copolymer(1) 3 | — | Magnesium stearate 1 | 40 |
| Ex. 11 | AS 100 | Copolymer(1) 3 | Isocyanuric acid 1 | - | 41 |
| Comp. Ex. 9 | AS 100 | Copolymer(1) 3 | - | - | 96 |
| Comp. Ex.10 | AS 100 | - | - | Magnesium stearate 1 | 96 |
| Comp. Ex.11 | AS 100 | - | Adipic acid 1 | - | 96 |
| Comp. Ex.12 | AS 100 | - | - | - | 99 |
| Ex. 12 | PC 100 | Copolymer(1) 3 | - | Magnesium stearate 1 | 59 |
| Ex. 13 | PC 100 | Copolymer(1) 3 | Isocyanuric acid 0.5 | - | 55 |
| Comp. Ex.13 | PC 100 | Copolymer(1) 3 | - | - | 99 |
| Comp. Ex.14 | PC 100 | - | - | Magnesium stearate 0.5 | 99 |
| Comp. Ex.15 | PC 100 | - | Adipic acid 0.5 | - | 99 |
| Comp. Ex.16 | PC 100 | - | - | - | 99 |

TABLE 3

| | Component | | | |
|---|---|---|---|---|
| | (A) wt.part | (B) wt.part | (C) wt.part | (D) wt.part |
| Ex. 14 | ABS(1) 100 | Copolymer(4) 3 | — | Magnesium stearate 1 |
| Ex. 15 | ABS(1) 100 | Copolymer(4) 3 | — | Calcium stearate 1 |
| Ex. 16 | ABS(1) 100 | Copolymer(4) 3 | Adipic acid 1 | — |
| Ex. 17 | ABS(1) 100 | Copolymer(4) 3 | Isocyanuric acid 1 | — |
| Ex. 18 | ABS(1) 100 | Copolymer(5) 3 | — | Magnesium stearate 1 |
| Ex. 19 | ABS(1) 100 | Copolymer(3) 3 | — | Sodium stearate 1 |
| Ex. 20 | ABS(2) 100 | Copolymer(4) 3 | — | Magnesium stearate 1 |
| Ex. 21 | ABS(2) 100 | Copolymer(4) 3 | Adipic acid 1 | — |
| Comp.Ex.17 | ABS(1) 100 | Copolymer(4) 3 | — | — |
| Comp.Ex.18 | ABS(1) 100 | — | — | Magnesium stearate 1 |
| Comp.Ex.19 | ABS(1) 100 | — | Adipic acid 1 | — |
| Comp.Ex.20 | ABS(1) 100 | — | — | — |
| Comp.Ex.21 | ABS(2) 100 | Copolymer(4) 3 | — | — |
| Comp.Ex.22 | ABS(2) 100 | — | — | Magnesium stearate 1 |
| Comp.Ex.23 | ABS(2) 100 | — | Isocyanuric acid 1 | — |
| Comp.Ex.24 | ABS(2) 100 | — | — | — |

TABLE 4

|  | MI 220° C., 10 kg (g/10 min.) | Gloss 60° (%) | Izod impact strength (kg · cm/cm) | | Flexural modulus (kg/cm$^2$) | Thermal deformation temperature 18.6 kg/cm$^2$ (°C.) |
| --- | --- | --- | --- | --- | --- | --- |
|  |  |  | 23° C. | −30° C. |  |  |
| Ex. 14 | 2.5 | 18 | 15 | 7.1 | 21000 | 94 |
| Ex. 15 | 2.3 | 20 | 14 | 6.8 | 20800 | 94 |
| Ex. 16 | 2.2 | 20 | 14 | 6.9 | 21000 | 93 |
| Ex. 17 | 2.6 | 22 | 15 | 6.9 | 21100 | 94 |
| Ex. 18 | 2.5 | 19 | 12 | 6.3 | 21000 | 95 |
| Ex. 19 | 2.5 | 18 | 12 | 6.1 | 21200 | 95 |
| Ex. 20 | 28 | 19 | 9.8 | 5.6 | 21300 | 82 |
| Ex. 21 | 28 | 20 | 9.5 | 5.6 | 21000 | 82 |
| Comp.Ex. 17 | 2.0 | 38 | 12 | 6.1 | 20500 | 94 |
| Comp.Ex. 18 | 4.1 | 85 | 17 | 7.3 | 23000 | 94 |
| Comp.Ex. 19 | 4.0 | 85 | 15 | 7.1 | 23000 | 94 |
| Comp.Ex. 20 | 4.2 | 87 | 17 | 7.4 | 23200 | 95 |
| Comp.Ex. 21 | 31 | 42 | 7.9 | 5.0 | 21500 | 81 |
| Comp.Ex. 22 | 32 | 41 | 8.2 | 5.4 | 22000 | 82 |
| Comp.Ex. 23 | 33 | 42 | 8.2 | 5.4 | 22100 | 82 |
| Comp.Ex. 24 | 30 | 42 | 8.5 | 5.9 | 22800 | 82 |

What is claimed is:

1. A thermoplastic resin composition comprising (A) an amorphous resin selected from the group consisting of a polystyrene-based resin, a vinyl cyanide-aromatic vinyl copolymer and a polycarbonate resin, and further comprising, per 100 parts by weight of the amorphous resin, 0.01 to 20 parts by weight of (B) an epoxy group-containing ethylene copolymer, and 0.01 to 20 parts by weight of at least one member selected from the group consisting of (C) a polyfunctional compound and (D) a metal salt of a $C_2$–$C_{20}$ aliphatic mono- or di-carboxylic acid or a metal salt of a $C_7$–$C_{13}$ aromatic mono-, di- or tri-carboxylic acid wherein said polyfunctional compound is a heterocyclic compound having per molecule, at least one unit represented by the formula (2)

wherein Z represents oxygen atom or sulfur atom.

* * * * *